United States Patent

[11] 3,558,916

| | | |
|---|---|---|
| [72] | Inventor | John J. Horn<br>Beaverton, Oreg. |
| [21] | Appl. No. | 709,071 |
| [22] | Filed | Feb. 28, 1968 |
| [45] | Patented | Jan. 26, 1971 |
| [73] | Assignee | Tektronix, Inc.<br>Beaverton, Oreg.<br>a corporation of Oregon |

[54] CIRCUIT RESPONSIVE TO INPUT SIGNALS OF A SELECTABLE DURATION
14 Claims, 3 Drawing Figs.

[52] U.S. Cl. .................................................. 307/234,
307/218, 328/111
[51] Int. Cl. ................................................. H03k 5/20
[50] Field of Search .......................................... 307/234,
218; 328/111, 112, 94; 329/106

[56] References Cited
UNITED STATES PATENTS

| 2,211,942 | 8/1940 | White.......................... | 328/111X |
| 2,609,501 | 9/1952 | Guthrie, Jr. ................... | 328/112 |
| 3,036,272 | 5/1962 | Vezu............................ | 328/112 |
| 3,132,263 | 5/1964 | Maass........................... | 328/112X |
| 3,191,067 | 6/1965 | Zimmerman................. | 307/215X |
| 3,226,570 | 12/1965 | Rosenbaum................... | 307/234X |
| 3,239,687 | 3/1966 | Steele........................... | 307/218 |
| 3,379,981 | 4/1968 | Humphreys................... | 328/112 |
| 3,219,838 | 11/1965 | Hurst............................ | 307/234 |

FOREIGN PATENTS 728,113   4/1955   Great Britain................   328/111

*Primary Examiner*—Stanley D. Miller, Jr.
*Attorney*—Buckhorn, Blore, Klarquist and Sparkman ABSTRACT: A circuit selectively responsive to input signals of a given duration includes AND circuit means coupled to input terminal means via a pair of circuit paths, wherein a signal must be present on each path in order to energize the AND circuit means. The first path substantially directly connects the input terminal means to the AND circuit means. The other path includes a timing means providing an input to a normally operative amplifier, which, in turn, supplies the remaining input to the AND circuit means. An input waveform coupled via the timing means to the normally operative amplifier is effective for disabling the amplifier for a predetermined period of time. However, if the input waveform is of greater than a predetermined duration, the amplifier will return to its operative condition while the input waveform is still present, whereby a pair of inputs are simultaneously applied to the AND circuit means for causing the AND circuit means to produce an output. A selectable switching means is connected for remotely energizing the amplifier and rendering the amplifier continuously operative. When the switching means is in its energizing position, the AND circuit means will be responsive to input waveforms of shorter, as well as those of longer duration.

PATENTED JAN 26 1971

3,558,916

JOHN J. HORN
INVENTOR

BY
BUCKHORN, BLORE, KLARQUIST & SPARKMAN
ATTORNEYS

CIRCUIT RESPONSIVE TO INPUT SIGNALS OF A SELECTABLE DURATION

BACKGROUND OF THE INVENTION

It is frequently required that a circuit be responsive to input waveform signals of a given duration, while being nonresponsive to input signals of another duration. For example, in a cathode ray oscilloscope, triggering coincident with waveforms of a given duration may be desired in order that only these waveforms or information related thereto will be displayed on the oscilloscope. In monitoring of television signals, one may wish to monitor horizontal rate waveforms, or only vertical rate waveforms. Conventional means frequently separate signals of one duration from another by employing a filtering circuit located in the signal path and responsive only to signals of over a given duration. Then an input triggering signal may be switched through such filtering circuit, or switched around the filtering circuit as desired. An arrangement of this type is illustrated in FIG. 1, wherein V represents an integrating circuit responsive to vertical television synchronization signals received from a synchronization signal input. When the switch 10 is in its upper position, sweep circuit 12 of an oscilloscope is responsive only to the vertical synchronization signals, whereas when switch 10 is in its lower position, sweep circuit 12 will also be rendered responsive to horizontal synchronization signals. Unfortunately, the synchronization signal input itself is switched by switch 10 in the FIG. 1 circuit, which may lead to complications if the switch is remotely located from the sweep circuit. Moreover, the method of recognition of the longer duration signals tends to be inaccurate, with recognition taking place at a rather indefinite time after the occurrence of more than one of the longer duration signals. An ultimate output is provided in response to a slowly rising integration value. The circuit V is arranged so that no appreciable integration takes place when only short horizontal synchronization signals are applied thereto.

SUMMARY OF THE INVENTION

According to the present invention, a selection circuit includes input terminal means for receiving input waveform signals, and AND circuit means responsive to the input waveform signals via plural circuit paths, each of which must be energized before the AND circuit means provides an output. Timing means are included in one of the paths for preventing energization of the AND circuit means through the said one of the paths, after the reception of a waveform signal, until a predetermined time period after reception of a waveform signal. Therefore, only a waveform signal of over a predetermined length will cause total energization of the AND circuit means for the production of an output.

The circuit further includes selectable or switchable override means coupled to the said one of the paths in order to substantially permanently provide an input to the AND circuit means through that path, whereby the AND circuit means will be responsive to shorter as well as longer pulses. The override means applies a bias to an amplifier included in the said one of the paths, and this bias is suitably a DC value which can be switched remotely. Therefore the input signal itself need not be remotely switched.

It is accordingly an object of the present invention to provide an improved pulse selection circuit for accurately distinguishing between input waveform signals of different duration.

It is a further object of the present invention to provide an improved pulse selection circuit which is simple and remotely switchable under the control of a bias voltage of the like.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
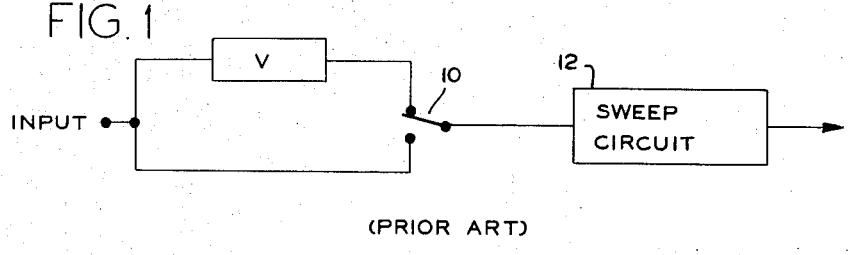
FIG. 1 is a schematic representation of a prior-art circuit.

As hereinbefore mentioned, FIG. 1 represents one prior-art method of differentiating between pulses of different length wherein V represents a low pass filter or integrator which builds up a voltage when a continuous train of long duration pulses is applied thereto. Switch 10 is employed to connect sweep circuit 12 directly to the input, or, alternatively, to the input via filter circuit V. As hereinbefore described, this circuit has two disadvantages. The first is that the input signal itself is switched by means of switch 10, and secondly, the recognition of longer duration input signals via circuit V is frequently not definite in time. Furthermore, recognition of the longer pulses usually takes place after more than one of such pulses have occurred whereby triggering of a sweep circuit may be delayed relative to the time when triggering would be required in order to view a complete, long duration input waveform.

Figure 2:
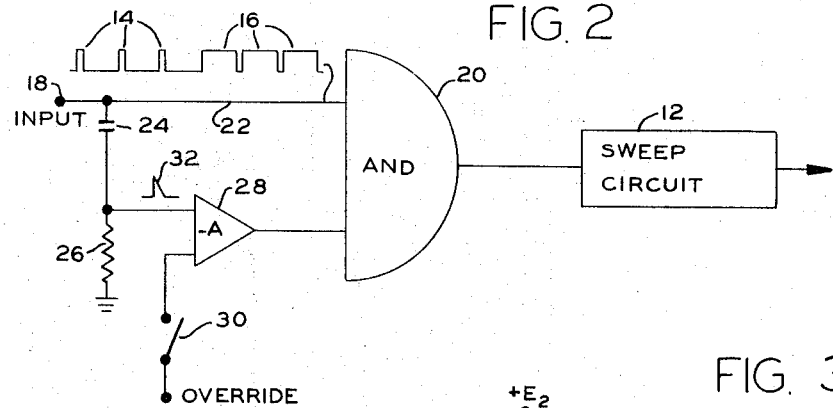
FIG. 2 is a schematic representation of a circuit according to the present invention.

A schematic representation of a circuit according to the present invention is illustrated in FIG. 2. In the illustrated embodiment, a series of television synchronization signals, including horizontal synchronization pulses 14 and longer vertical synchronization pulses 16, is applied at input terminal 18. The input terminal is coupled to an AND circuit 20 via first and second circuit paths. The first circuit path 22 suitably comprises a direct connection between input terminal 18 and one input of AND circuit 20. The second circuit path includes a timing means, here comprising a capacitor 24 and a resistor 26 serially connected in that order between input terminal 18 and ground. The junction between capacitor 24 and resistor 26 is connected to an amplifier 28, the output of which is coupled as a remaining input to AND circuit 20. Both inputs must be applied to AND circuit 20 before AND circuit 20 produces an output for energizing sweep circuit 12.

The amplification of amplifier 28 is designated as –A. This amplifier is normally in an operative or on condition for providing one input for AND circuit 20, but when an input waveform signal at input terminal 18 is coupled to amplifier 28 via capacitor 24, the amplifier 28 will be turned off for a period proportional to the discharge time of capacitor 24 through resistor 26, after which amplifier 28 again provides an input to AND circuit 20. As will be understood by those skilled in the art, capacitor 24 and resistor 26 connected in this way comprise a differentiating circuit.

Amplifier 28 is also provided with an override input coupled thereto by way of override switch 30. When closed, it connects a DC bias voltage to amplifier 28 for maintaining amplifier 28 in an operative or on condition despite the differentiated input which may be supplied via capacitor 24.

Considering operation of the FIG. 2 circuit, when switch 30 is open, horizontal synchronization pulses 14 each cause application of a differentiated pulse 32 to amplifier 28 rendering the amplifier inoperative and disabling one input to AND circuit 20. The other input of AND circuit 20 via path is operative, but a horizontal synchronization pulse 14 will have concluded before differentiated pulse 32 declines sufficiently for amplifier 28 to supply the other required input for AND circuit 20. Therefore, AND circuit 20 provides no output to sweep circuit 12, in the case of horizontal synchronization pulses 14.

When a vertical synchronization pulse 16 is received, again the same differentiated pulse 32 is provided. However, as differentiated pulse 32 declines, such that amplifier 28 once more supplies an input to AND circuit 20, a vertical synchronization pulse 16 will still be present due to its greater length. The pulse is applied via path 22. AND circuit 20 will then produce an output for triggering sweep circuit 12. In a particular embodiment, this triggering takes place about 15 microseconds after the beginning of a first vertical synchronization pulse 16.

Figure 3:
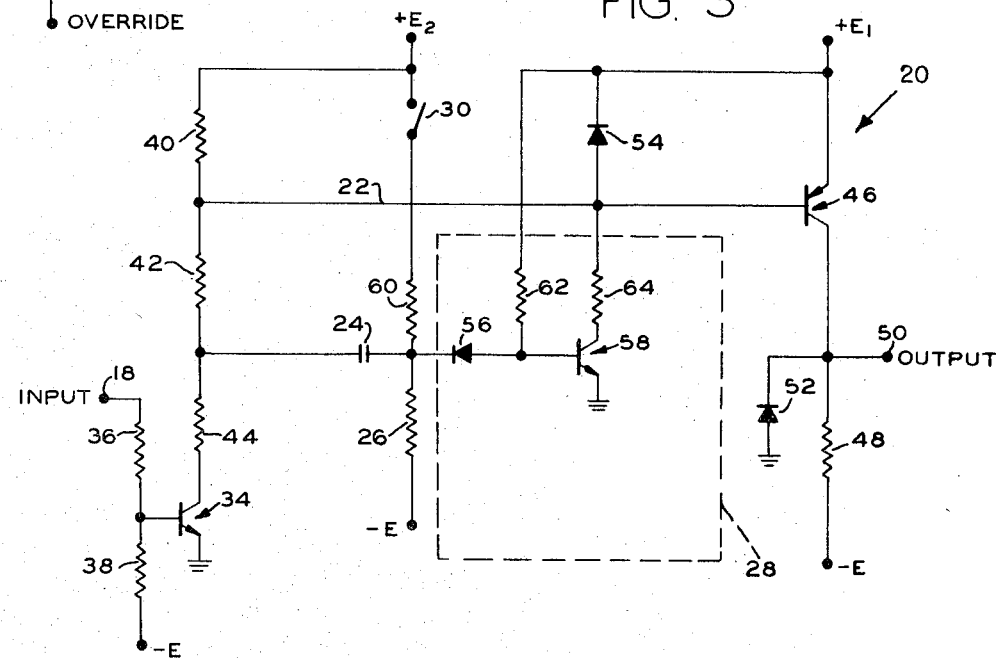
FIG. 3 is a schematic diagram of a particular form of a circuit according to the present invention.

A specific circuit according to the present invention is illustrated in FIG. 3 wherein like elements are referred to employing like reference numerals. Input terminal 18 is coupled to the base of an NPN transistor 34, comprising a first stage, via input resistor 36. The base of transistor 34 is also returned to a voltage $-E$ via resistor 38. The emitter of transistor 34 is grounded, and its collector is coupled to a voltage $+E_2$ through a voltage divider comprising resistors 40, 42, and 44 connected in that order between $+E_2$ and the transistor's collector. The tap between resistors 40 and 42 is coupled to the base of an output stage or AND gate PNP transistor 46 via lead 22 completing a first circuit path. The emitter of transistor 46 is connected to a voltage $+E_1$, which voltage is less than $+E_2$, and the collector of transistor 46 is returned to the voltage $-E$ through load resistor 48. An output terminal 50 is also connected to the collector of transistor 46, as well as to the cathode of a clamping diode 52, the anode of which is connected to ground. A clamping diode 54 is also connected to the base of transistor 46, the anode of diode 54 being connected to the transistor base, and the cathode of diode 54 being connected to the voltage $+E_1$.

A second circuit path between the input stage and the output stage includes capacitor 24 and resistor 26, and is completed via a third stage or amplifier 28. Capacitor 24 is connected to the voltage divider tap between resistors 42 and 44. A disconnect diode 56 couples the junction between capacitor 24 and resistor 26 to the base of NPN transistor 58, the base of transistor 58 also being returned to $+E_1$ through resistor 62. The anode of diode 56 is connected to the base of transistor 58 while the cathode of diode 56 is connected to the junction between capacitor 24 and resistor 26. The cathode of diode 56 is also coupled to override switch 30 through resistor 60, the opposite terminal of override switch 30 being connected to $+E_2$. The emitter of transistor 58 is grounded while its collector is connected to the base of transistor 46 through resistor 64.

Considering the operation of the FIG. 3 circuit, transistor 34 is biased so that a positive signal at terminal 18 will turn on transistor 34 through resistor 36. However, when the input terminal 18 is in a normal or minus state, resistor 38, connected to $-E$, will turn off transistor 34. When no input signal is received, i.e. when transistor 34 is in the off state, the cathode of diode 54 is connected to the voltage $+E_1$, and its anode is connected to the voltage $+E_2$ through resistor 40. Voltage $+E_2$ is larger than $+E_1$ so that diode 54 normally conducts. It also clamps the base of transistor 46 at a voltage greater than $+E_1$ by the amount of the diode drop so that transistor 46 is normally nonconducting. Diode 54 also prevents the voltage at the base of transistor 46 from increasing to the point where transistor breakdown would result, and provides a predetermined voltage level at the base of transistor 46 so that triggering jitter will be substantially avoided.

When an input signal is received and transistor 34 conducts, current is drawn from $+E_2$ through the voltage divider comprising resistors 40, 42, and 44. The additional current through resistor 40 is, however, insufficient to appreciably change the voltage at the anode of diode 54 and at the base of transistor 46. An additional current from the collector of transistor 58 through resistor 64 is required in order to bring the base of transistor 46 to the forward bias region whereby an output from transistor 46 would be produced. When transistor 34 and transistor 58 are on simultaneously, diode 54 becomes reverse biased and allows transistor 46 to turn on. Thus, transistor 46 operates as an AND gate, requiring an input from a pair of input paths before it conducts. The first input path comprises lead 22, while the second input path comprises the capacitor 24 resistor 26 timing circuit, and amplifier 28.

In the nondiscriminating mode, that is, when pulses of varying lengths are to produce a circuit output, override switch 30 is closed, thereby connecting the cathode of diode 56 to $+E_2$ via resistor 60. At this time, diode 56 is reverse biased, and current through resistor 62 holds transistor 58 in the on state. Since, when switch 30 is in the closed position, transistor 58 conducts constantly, transistor 46 will conduct whenever transistor 34 conducts. Then, an input signal, e.g. a horizontal pulse, turns on transistor 34, which turns on transistor 46, since transistor 46 then receives inputs from both transistors 34 and 58.

Before an input signal is received, output terminal 50 is clamped substantially at ground level by diode 52, but when the aforementioned input is received at terminal 18, the output terminal 50 will be clamped substantially at the voltage $+E_1$ by saturated transitor 46. The output stage transistor 46 thus operates as an amplifier and as a clipper, as well as an AND gate.

If resistor 60 is disconnected from $+E_2$, as by opening override switch 30, current from $-E$ through resistor 26 causes diode 56 to conduct. Current through resistor 26 is less than current through resistor 62, and therefore transistor 58 is normally conducting, and the amplifier is normally in the on state providing an input to transistor 46 via resistor 64. However, if a positive going input signal is now received at terminal 18, transistor 34 is turned on, thereby producing a negative step at the collector of transistor 34. A portion of this negative going signal is coupled to the differentiating or timing circuit essentially comprising capacitor 24 and resistor 26. The negative step is coupled through capacitor 24 and through diode 56 to the base of transistor 58 and immediately turns transistor 58 off, before the input signal via path 22 can turn transistor 46 on. Thus, although an input signal is provided transistor 46 via lead 22, no signal is now provided via resistor 64 from amplifier 28. Consequently, transistor 46 will remain off as long as transistor 58 remains off. Transistor 58 will remain off until the current through capacitor 24 has decreased to the point where it can no longer override turn-on current through resistor 62. At such time, determined by the time constant of the capacitor 24 resistor 26 combination, transistor 58 will return to its conducting state, and current will be drawn through resistor 64 providing the second input for transistor 46. The base of transistor 58 is brought back into the forward bias region at an accurately predetermined time after the reception of an input signal at input terminal 18. At such time, transistor 58 turns on quickly, and, as a result, transistor 46 turns on quickly, providing an input signal is still present for also energizing transistor 46 via lead 22.

Thus, if the input signal duration is long enough so that transistor 34 is still on when transistor 58 turns back on, the output at terminal 50 switches from substantially ground level to substantially $+E_1$, and remains there until the input signal allows transistor 34 to turn off. However, if the input pulse is short compared to the discharge time of capacitor 24, transistors 34 and 58 will not both energize transistor 46 at the same time, and output terminal 50 will remain clamped to ground.

Thus, pulse discrimination is provided when override switch 30 is open whereby only input pulses of longer than a predetermined duration result in an amplified and clipped output at terminal 50. The terminal 50 output may, of course, be applied for triggering a sweep circuit or for any other desired purpose. This selection of longer pulses may be accomplished remotely through operation of switch 30 which can, for example, be located on a remote front panel of an instrument. The leads to switch 30 carry only DC bias for amplifier 28, and no output signal or triggering signal need be switched. Pulses of longer duration are selectively and accurately distinguished in a relatively simple circuit according to the present invention. In the illustrated embodiment, television vertical synchronization pulses produce an amplified and clipped output at terminal 50 substantially 15 microseconds after the start of the vertical synchronization signal. Of course, this time can be adjusted by selection of the values of capacitor 24 and resistor 26.

Although the illustrated embodiment is employed for the selective recognition of vertical and horizontal television synchronization signals, it is apparent that the circuit may be employed to recognize other input waveforms of different duration. Moreover, although selective determination of only one length of longer pulses is herein illustrated, and described, it is apparent that the same circuit may be repetitively expanded, within the scope of the present invention, to selectively distinguish between a larger number of pulse lengths. For example, the portion of the FIG. 3 circuit including capacitor 24, resistor 26, and amplifier 28 may be duplicated with differing time constants for the capacitor 24 resistor 26 combination being chosen. The respective amplifiers 28 are then selected by means of a plurality of switches 30, only one of which will be open to select a given amplifier. In such a circuit, the output AND gate, as provided by transistor 46, requires the presence of all inputs from all circuit paths connected in input relation thereto before an output is produced.

While I have shown and described preferred embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. A selection circuit comprising:
input terminal means for receiving input waveform signals of varying duration;
AND circuit means responsive to the simultaneous presence of plural input signals to produce an output therefrom;
at least first and second circuit paths coupling said input terminal means to said AND circuit means, signals on each path being necessary to operate said AND circuit means;
a timing means included in one of said paths for preventing energization of the AND circuit means through the said one of said paths after the reception of a waveform signal until a predetermined period after the reception of such waveform signal, so that a waveform signal of over a predetermined length causes energization of said AND circuit means through each path for producing an output from said AND circuit means; and
switch means for selectively coupling a DC bias to the said one of said paths which includes said timing means for energizing the AND circuit means through the said one of said paths to render said AND circuit means responsive to a waveform signal of less than as well as greater than said predetermined length.

2. The circuit according to claim 1 where said AND circuit means comprises a clipping amplifier operative to produce a clipped and amplified output.

3. The circuit according to claim 1 wherein said timing means comprises a differentiating circuit coupled to receive its input from said input terminal means, said timing means providing a differentiated output to said one of said paths.

4. A selection circuit comprising:
input terminal means for receiving input waveform signals of varying duration;
AND circuit means responsive to the simultaneous presence of plural input signals to produce an output therefrom;
at least first and second circuit paths coupling said input terminal means to said AND circuit means, signals on each path being necessary to operate said AND circuit means;
a timing means included in one of said paths for preventing energization of the AND circuit means through the said one of said paths after the reception of a waveform signal until a predetermined period after the reception of such waveform signal;
said timing means comprising a differentiating circuit coupled to receive its input from said input terminal means, said timing means providing a differentiated output to said one of said paths; and
said circuit including an amplifier in said one of said paths between said differentiating circuit and said AND circuit means, said amplifier being connected normally to provide an input to said AND circuit means and being responsive to a differentiated signal from said differentiating circuit for discontinuing the input from said amplifier to said AND circuit means for a predetermined time depending upon the time constant of said differentiating circuit, such that when an input waveform at said input terminal means exceeds a predetermined time period, a signal will be provided via each path to said AND circuit means for energizing said AND circuit means.

5. The circuit according to claim 4 further including a remotely operable switch through which bias is selectively applied to said amplifier for maintaining said amplifier in an energized condition for providing an input to said AND circuit means.

6. The circuit according to claim 5 further including a diode coupled between the input of said amplifier and said differentiating circuit, and to which said switch is coupled for applying bias to said diode for selectively connecting and disconnecting said diode.

7. The circuit according to claim 6 further including an input transistor for receiving waveform signals from said input terminal means and providing an output for said circuit paths.

8. A selection circuit comprising:
input terminal means for receiving input waveform signals of varying duration;
AND circuit means responsive to the simultaneous presence of plural input signals to produce an output therefrom;
at least first and second circuit paths coupling said input terminal means to said AND circuit means, signals on each path being necessary to operate said AND circuit means,
a timing means included in one of said paths for preventing energization of the AND circuit means through the said one of said paths after the reception of a waveform signal until a predetermined period after the reception of such waveform signal, so that a waveform signal of over a predetermined length causes energization of said AND circuit means through each path for producing an output from said AND circuit means; and
said AND circuit means comprising a transistor amplifier with a clamping diode operative to clamp said transistor amplifier in a nonoperative condition except when input signals are applied to said amplifier through each circuit path.

9. A pulse selection circuit comprising:
an input stage for receiving input waveform signals of varying duration;
an output stage responsive to the simultaneous presence of plural inputs to produce an output;
a first circuit path coupling an output of the input stage as an input to the output stage;
a second circuit path coupling an output of said input stage as an input to said output stage, said second path including a timing means receiving the output of said input stage and a third stage receiving the output of said timing means, wherein the output of said third stage is provided as a second input to the output stage, both inputs to said output stage via both said paths being required to operate said output stage; and
selectable switching means connected to a DC potential for selectively biasing said third stage in an energizing condition relative to said output stage.

10. The circuit according to claim 9 wherein said timing means comprises a differentiating circuit for receiving an output of said input stage and providing the same as a disabling input to said third stage for a predetermined time.

11. The circuit according to claim 10 wherein said output stage comprises a clipping amplifier.

12. The circuit according to claim 11 wherein the clipping amplifier comprises a transistor providing an output at its collector terminal, the emitter of said transistor being connected to one clipping level, and a diode clamping said collector terminal to a second clipping level.

13. A pulse selection circuit comprising:
an input stage for receiving input waveform signals of varying duration;
an output stage responsive to the simultaneous presence of plural inputs to produce an output;
a first circuit path coupling an output of the input stage as an input to the output stage;
a second circuit path coupling an output of said input stage as an input to said output stage, said second path including a timing means comprising a differentiating circuit receiving the output of said input stage and a third stage receiving the output of said timing means, wherein said output of said timing means disables said third stage for a predetermined time, the output of said third stage being provided as a second input to the output stage, both inputs to said output stage via both said paths being required to operate said output stage;
said differentiating circuit comprising a capacitor for coupling the output of said input stage as an input to said third stage and a resistor for returning the output end of said capacitor to a reference potential, said second circuit path further including a disconnect diode coupled between said capacitor and the input to said third stage; and
selectable switching means connected for selectively maintaining said third stage in an energizing condition relative to said output stage, said switching means being coupled to provide a potential at the junction between said capacitor and said diode for selectively disconnecting said capacitor from said third stage and maintaining said third stage in an energizing condition.

14. A pulse selection circuit comprising:
an input stage for receiving input waveform signals of varying duration;
an output stage responsive to the simultaneous presence of plural inputs to produce an output;
a first circuit path coupling an output of the input stage as an input to the output stage;
a second circuit path coupling an output of said input stage as an input to said output stage, said second path including a timing means receiving the output of said input stage and a third stage receiving the output of said timing means, wherein the output of said third stage is provided as a second input to the output stage, both inputs to said output stage via both said paths being required to operate said output stage;
said output stage comprising a clipping amplifier, said clipping amplifier including a transistor having a clamping diode coupled to the input terminal thereof, wherein said input terminal is also coupled to receive the outputs of said input stage and said third stage;
a voltage divider connected as a load for said input stage, the input terminal of said output stage being coupled to a tap of said voltage divider to provide said first circuit path, said voltage divider being returned to a voltage higher than the clamping voltage of said diode for normally maintaining said output stage in a clamped and nonconducting condition; and
selectable switching means connected for selectively maintaining said third stage in an energizing condition relative to said output stage.